United States Patent [19]

Gorder

[11] Patent Number: 4,746,065
[45] Date of Patent: May 24, 1988

[54] CROP SPRAYER

[76] Inventor: Norman S. Gorder, Rte. 1, Gary, Minn. 56545

[21] Appl. No.: 919,694

[22] Filed: Oct. 16, 1986

Related U.S. Application Data

[63] Continuation-in-part of Ser. No. 542,575, Oct. 17, 1983, Pat. No. 4,629,123.

[51] Int. Cl.4 .............................................. B05B 1/20
[52] U.S. Cl. .................................... 239/168; 172/517
[58] Field of Search ............................... 239/166–168, 239/146, 172, 161, 162, 726, 730, 142, 144; 366/336, 337, 340; 172/517, 508, 81; 47/1.5, 1.7; 180/900, 69.1; 280/160

[56] References Cited

U.S. PATENT DOCUMENTS

| | | | |
|---|---|---|---|
| 1,384,411 | 7/1921 | Springer | 172/517 X |
| 2,755,128 | 7/1956 | Baish | 239/168 |
| 3,683,547 | 8/1972 | Harden | 239/146 X |
| 4,062,305 | 12/1977 | Stoker | 172/517 X |
| 4,227,649 | 10/1980 | Poffenroth | 239/163 X |
| 4,446,928 | 5/1984 | McClure et al. | 239/167 X |
| 4,583,319 | 4/1986 | Wolff et al. | 239/159 X |
| 4,629,123 | 12/1986 | Gordon | 239/172 X |

FOREIGN PATENT DOCUMENTS 2450035 10/1980 France ............................. 239/168
288827 7/1969 U.S.S.R. .

*Primary Examiner*—Andres Kashnikow
*Assistant Examiner*—Kevin Weldon
*Attorney, Agent, or Firm*—Herman H. Bains

[57] ABSTRACT

A towed type crop sprayer for spraying a liquid agricultural chemical upon a standing crop includes a frame having a tank mounted thereon and having a horizontal transversely extending boom assembly thereon for supporting a spray device. A centrally located cylinder and piston unit and cable tensioning mechanism are operable to produce ready vertical adjustment of the boom assembly and spray device carried thereby. The tractor which tows the crop sprayer, and the crop sprayer, are provided with belly pans to smoothly engage the standing crop to minimize damage thereto. The ground engaging wheels of the tractor and the crop sprayer are provided with grain dividers which progressively part the standing crops during movement of the tractor and crop sprayer and thereby minimize damage to the standing crop during the spraying operation.

4 Claims, 3 Drawing Sheets

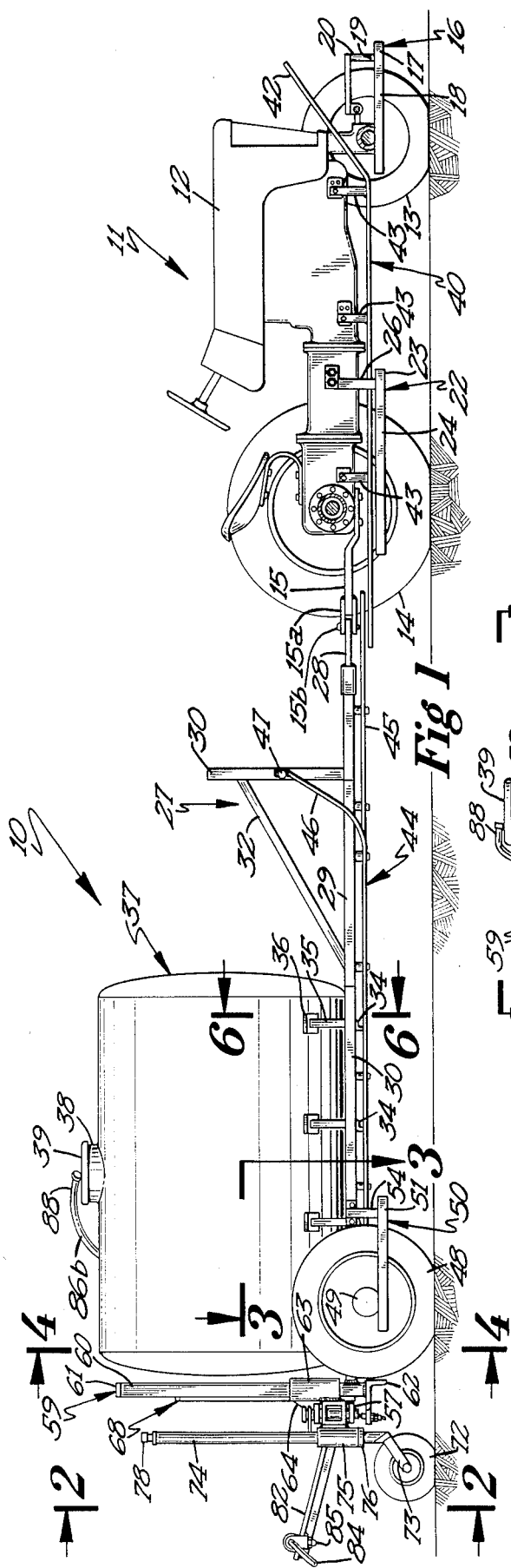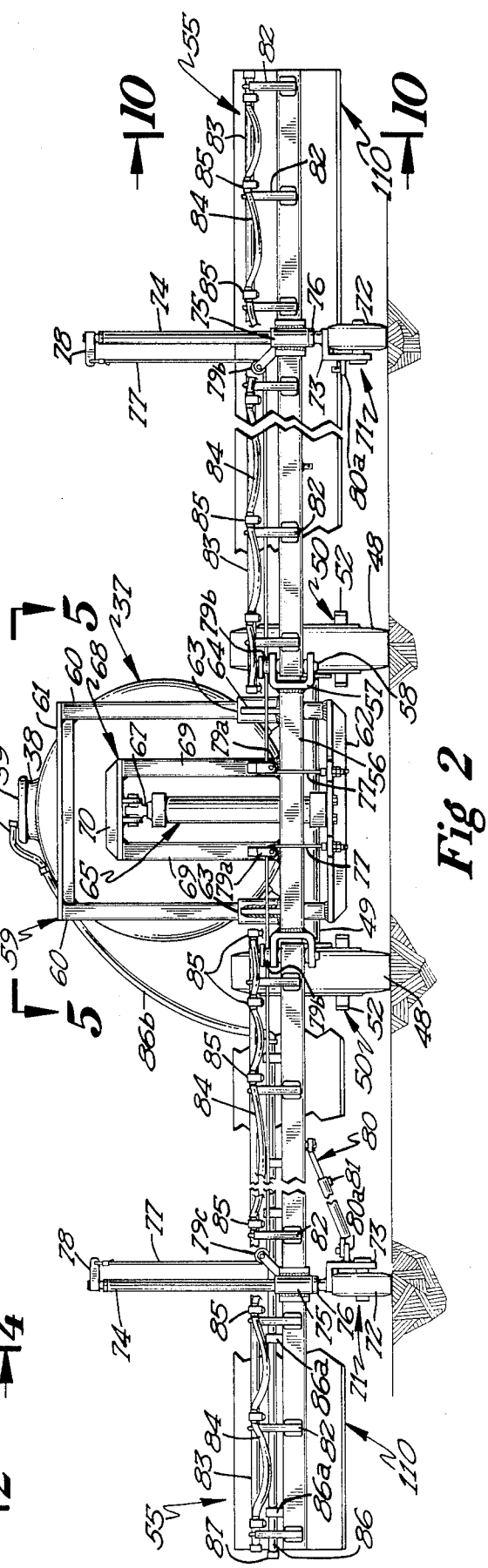

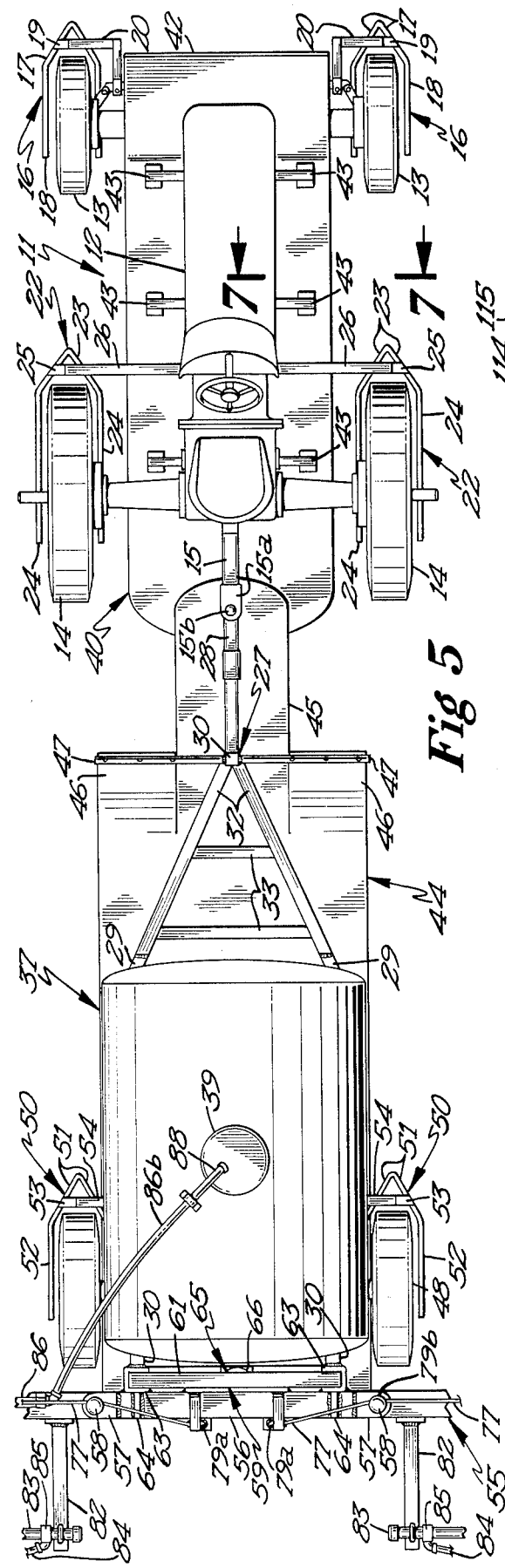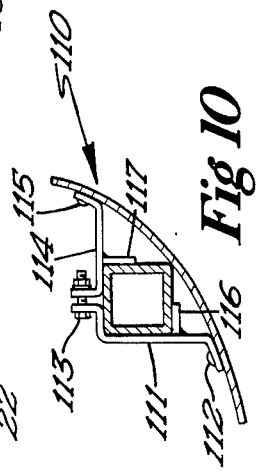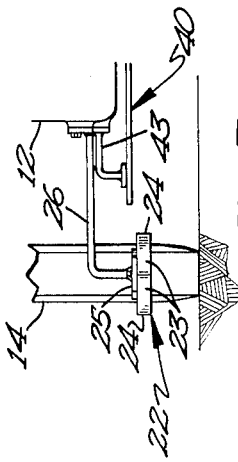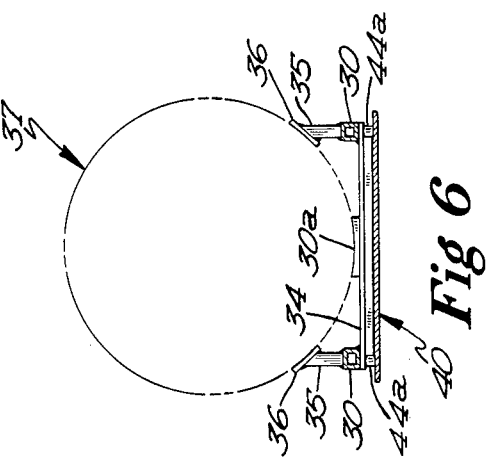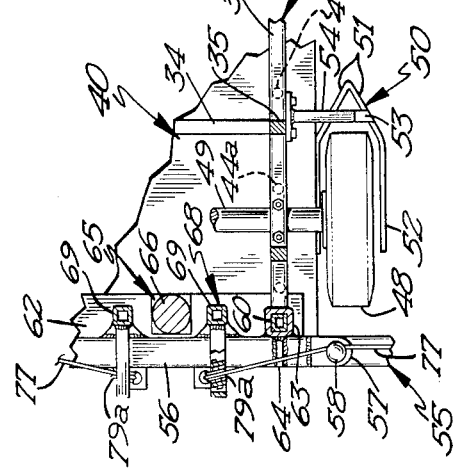

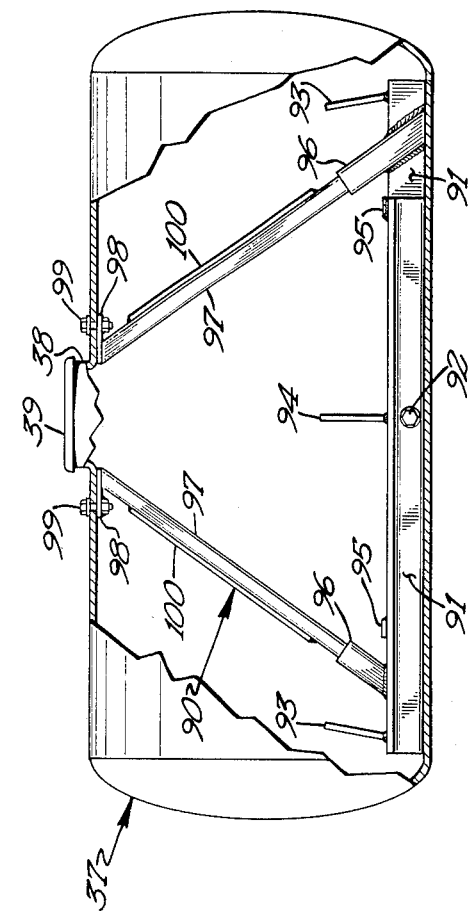
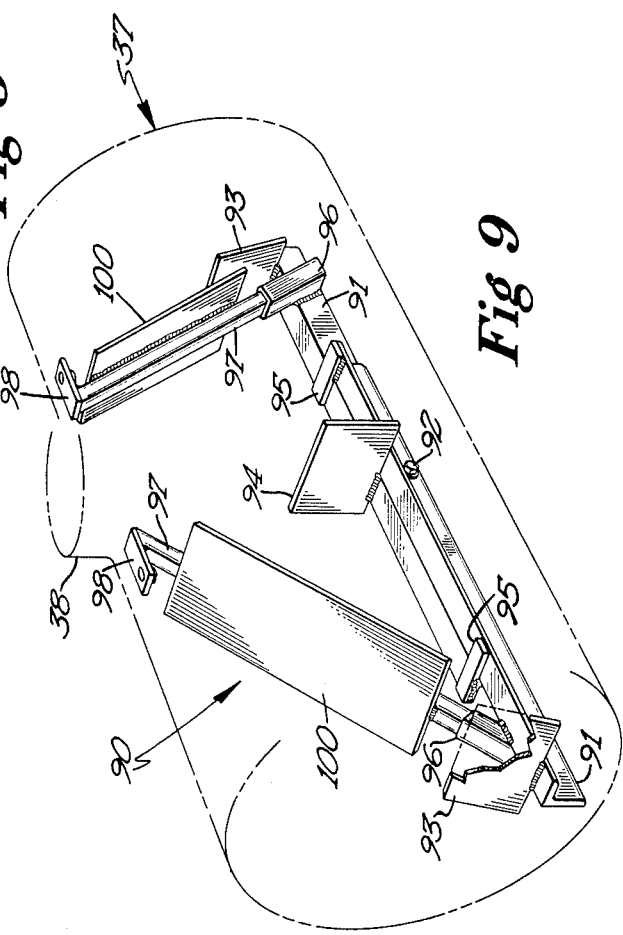
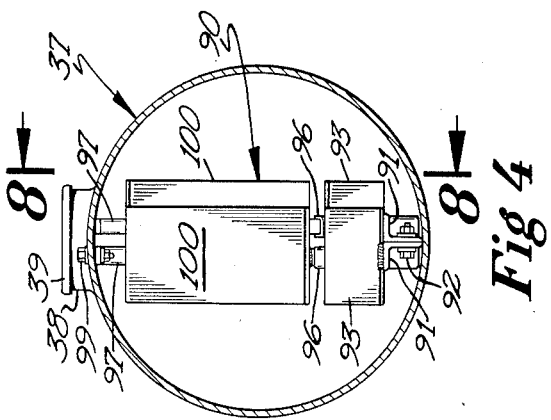

CROP SPRAYER

This application is a continuation-in-part of my copending application Ser. No. 542,575, filed Oct. 17, 1983, and entitled CROP SPRAYER, now U.S. Pat. No. 4,629,123, issued Dec. 16, 1986.

This invention relates to an agricultural implement and, more specifically, to a crop sprayer for spraying liquid agricultural chemicals on agricultural crops.

BACKGROUND OF THE INVENTION

In my co-pending application Ser. No. 542,575, it was pointed out that liquid agricultural sprays were applied to crops in two basic ways. In one manner of application, the liquid chemical sprays were applied to the crops during the tillering stage when the crops were quite small and a conventional ground-type crop sprayer could traverse the field without causing damage to the small plants. However, conventional ground supported crop sprayers are usually not suitable during the latter stages of growth. For example, during the stem extension stage, the likelihood of damage to the standing crops increases if the chemical spray is applied by a ground traversing conventional crop sprayer. Conventional crop sprayers are even more unsuitable for applying liquid agricultural sprays during the heading and ripening stage of the crop.

However, in order to obtain a good yield, it is often necessary to apply chemical spray, for example, a fungicide, during the heading and ripening stages of crops, especially wheat, barley, and the like. Spraying at these latter stages of growth has been typically done by aerial spraying in order to avoid damage to the standing crop. The effectiveness of aerial spraying is dependent in large part upon the weather conditions and, even then, the application of the liquid spray is not as effective as ground spraying if damage to the standing crop can be avoided. Further, the liquid spray must be concentrated when applied by crop dusting because of the limitations of the capacity of the airplane.

SUMMARY OF THE INVENTION

It is the general object of this invention to provide a tractor towed novel crop sprayer implement in which the tractor body and the implement frame are both provided with belly pans to permit traversal of the tractor and implement over a standing crop without damage thereto, even though the crop being sprayed is in the heading or ripening stages.

Another object of this invention is the provision of a tractor towed crop sprayer implement in which the wheels of the tractor and the wheels of the sprayer implement are both provided with grain dividers which are effective in deflecting the standing crop out of the path of the wheels to thereby prevent damage to the plants.

A further object of this invention is the provision of a tractor towed crop sprayer, including a height adjustment mechanism mounted on the frame of this sprayer, which permits ready vertical adjustment of the sprayer boom relative to the ground surface.

These and other objects of the invention will be more fully defined in the following Specification.

FIGURES OF THE DRAWING

FIG. 1 is a side elevational view of the novel crop sprayer connected in towed relation with a tractor;

FIG. 2 is a rear elevational view, as viewed along lines 2—2 of FIG. 1 and looking in the direction of the arrows with certain parts thereof foreshortened for clarity;

FIG. 3 is a cross-sectional view taken approximately along line 3—3 of FIG. 1 and looking in the direction of the arrows;

FIG. 4 is a cross-sectional view taken approximately along line 4—4 of FIG. 1 and looking in the direction of the arrows;

FIG. 5 is a cross-sectional view taken approximately along line 5—5 of FIG. 1 and looking in the direction of the arrows;

FIG. 6 is a cross-sectional view taken approximately along line 6—6 of FIG. 1 and looking in the direction of the arrows;

FIG. 7 is a cross-sectional view taken approximately along line 7—7 of FIG. 1 and looking in the direction of the arrows;

FIG. 8 is a cross-sectional view taken approximately along line 8—8 of FIG. 4 and looking in the direction of the arrows;

FIG. 9 is a perspective view of the baffle frame in the erect operative position; and FIG. 10 is a cross-sectional view taken approximately along line 10—10 of FIG. 2 and looking in the direction of the arrows.

DESCRIPTION OF THE PREFERRED EMBODIMENT

Referring now to the drawings and, more specifically, to FIGS. 1 and 5, it will be seen that one embodiment of the improved novel crop sprayer, designated generally by the reference numeral 10, is shown in towed relation with respect to a tractor 11. The tractor 11 is of conventional commercial construction and includes a body 12, front wheels 13, rear wheels 14, and a hitch 15. Since the tractor 11 will tow the crop sprayer through a field in which the standing crop may be in the heading or ripening stages, it is essential that both the tractor and the crop sprayer be provided with means to prevent damage to the crop. The present invention has special utility with respect to grain crops, such as wheat, barley, oats, and the like.

In this regard, the tractor 11 is provided with front wheel grain dividers 16, which are V-shaped configurations, and which serve to spread the grain forwardly of the front wheels and to minimize damage to the grain. Each front wheel grain divider 16 includes a pair of forwardly converging arms 17 which are joined together at their front ends, each being integral with a rear portion 18. It will be noted that the rear portions 18 of each front wheel grain divider 16 are disposed in substantial parallel relation with respect to each other, and these rear portions extend ⅔ of the diameter of the front wheels.

It is also pointed out that, in the preferred embodiment, these grain dividers will be spaced approximately 12 inches or so above the surface of the ground and are preferably disposed in substantial parallel relation with respect to the ground surface. Each front wheel grain divider is provided with a transverse strap 19, which extends between the forwardly converging arms, and an L-shaped bracket 20 is affixed to the strap and is also affixed to the tractor. In the embodiment shown, the L-shaped bracket is affixed to the tie rod.

Referring again to FIGS. 1 and 5, it will also be seen that the rear wheels 14 of the tractor are also provided with rear wheel dividers 22. These grain dividers 22 vary only in size, but have substantially the same configuration as the grain dividers 16. Thus, each grain divider 22 includes forwardly converging arms 23, which are integrally connected at their front ends, and each terminating rearwardly in a pair of rearward parallel portions 24. Again, it will be noted that the grain dividers 22 extend from a point forwardly of each rear wheel rearwardly to a point corresponding to approximately ⅔ the radius of the associated wheel. Each grain divider 22 is provided with a transverse strap 25 to which an L-shaped bracket 26 is connected. The L-shaped bracket 26 is secured to the tractor so that each grain divider 22 is spaced approximately 12 inches above and in parallel relation to the ground surface.

The crop sprayer 10 includes a sprayer frame or main frame 27, which has an elongate tongue 28 projecting forwardly from the front end thereof. The front end of the tongue is pivotally connected by a pivot pin 15b to the clevis 15a of the tractor hitch 15. This permits articulation between the tractor and crop sprayer.

The sprayer frame 27 also includes a pair of longitudinal frame elements 29, which converge forwardly and are rigidly interconnected to the tongue 28. Each longitudinal frame element 29 also includes rearward parallel portions 30. A vertical post 31 is rigidly affixed to the tongue and longitudinal frame elements 39 and projects upwardly therefrom. Inclined diverging braces 32 extend downwardly and outwardly from the post 31 and are rigidly interconnected to the longitudinal frame elements 29 just forwardly of the rear parallel portions 30 thereof. The braces 32 are also rigidly interconnected by suitable transverse braces 33.

The rearwardly extending parallel portions 30 of the longitudinal frame elements are rigidly interconnected by suitable transverse frame elements 34, which are of angle construction. Vertically disposed support posts 35 are rigidly interconnected to the longitudinal frame elements and project upwardly therefrom. Each support post has a pad 36 rigidly affixed thereto, which engages an elongate cylindrical tank 37. The tank 37 has a filler opening 38 at its upper end, which is closed by a suitable closure cap 39.

Means are also provided for preventing damage to the standing crops by the tractor, especially when the crops being sprayed are in the heading or ripening stage. This means includes an elongate generally rectangular-shaped tractor belly pan 40, which is of substantially uniform width, and which is formed of a light gauge metal. The tractor belly pan 40 is comprised of a substantially flat portion 41, which extends from a point located rearwardly of the tractor, in a forward direction and terminates in a front upturned forward portion 42. The upturned front end of the belly pan progressively deflects the standing crop downwardly, and the smooth planar surface of the flat portion 41 passes over the deflected crops without causing breakage of the stems or damage to the heads. Thus, the use of a belly pan of this configuration minimizes, if not eliminates, any damage to a standing crop, even when the latter is in the later stages of growth.

Means are provided for securing the tractor belly pan to the tractor, and this means includes a plurality of longitudinally spaced apart brackets 43, each having one end thereof secured to the tractor, and having the other end thereof secured to the upper surface of the tractor belly pan. It will be seen that the tractor belly pan is positioned in substantially parallel relation with respect to the ground and is disposed at only a slightly higher level than the grain dividers 16 and 22, respectively. It will further be noted that the rear end portion of the tractor belly pan extends slightly beyond the articulated hitch connection between the tractor and the crop sprayer.

The crop sprayer 10 is also provided with a sprayer belly pan 44, which is of generally elongate rectangular configuration, and which is of substantially uniform width. It will be noted that the tractor belly pan 40 has a width dimension substantially greater than the width dimension of the tractor body, but that the sprayer belly pan has a width dimension approximating the diameter of the cylindrical tank 11. The sprayer belly pan 44 includes a central forwardly projecting portion 45, which is of generally rectangular configuration, and which underlies the tongue of the sprayer frame 27. It will also be noted that this central portion overlies and overlaps the rear portion of the tractor belly pan 40. This rear belly pan 44 also includes upturned arcuate portions 46, which extend upwardly adjacent opposite edge portions of the rear end of the central portion 45.

The upper edge of each of the upturned portions 46 are rigidly secured to one of a pair of laterally extending horizontal braces 47, each being secured to the post 30 intermediate the ends thereof. These braces 37 serve to rigidify and hold the front end portions in their upturned configuration. It will also be noted that the sprayer belly pan underlies substantially the entire sprayer frame and tongue, and is disposed in substantially parallel relation with the surface of the ground. Again, it will be noted that the sprayer belly pan is disposeed at substantially the same level as the tractor belly pan 40. Suitable brackets 44a extend between and are rigidly secured to the longitudinal frame members 29 and the upper surface of the belly pan 44. It is pointed out that the upturned portions 46 progressively and gently deflect the crop downwardly during traversal of the tractor and crop sprayer through the field, and the lower surface of the belly pan is planar and smooth and cooperates with the tractor belly pan to minimize, if not eliminate, damage to the crop.

Referring now to FIGS. 3 and 5, it will be seen that the sprayer frame 27 is provided with a pair of ground engaging wheels 48 for supporting the crop sprayer for travel over the surface of the ground. Wheels 48 are journaled on a suitable axle 49, which is rigidly secured to the sprayer frame 27. Each wheel 48 is provided with a grain divider 50, which is similar in construction to the grain dividers 16 and 22 for the tractor wheels, but slightly different dimensionally.

Therefore, each grain divider includes a pair of forwardly converging arms 51, which are integrally joined at their front ends, and which terminate in parallel rear portions 42. The forwardly converging arms 51 are rigidly interconnected by a transverse strap 53 to which is secured an L-shaped bracket 54. Each L-shaped bracket 54 is rigidly secured to one of the longitudinal frame elements 29 of the sprayer frame 27. Each frame divider is disposed in substantial parallel relation with respect to the surface of the ground and at substantially the same height as the grain dividers 16 and 22.

The crop sprayer 10 includes a boom assembly, which is comprised of a pair of elongate outer spray booms 55, which are of substantially identical construction, and which are of substantially rectangular tubular configuration. The inner ends of each of these outer spray booms are pivotally connected to a central boom 56 for pivotal movement therebetween about a substantially vertical axis. In this regard, each end of the central boom is provided with a U-shaped pivot element 57, and a vertical pivot pin 58 extends through the U-shaped pivot element and the end of an associated outer boom to pivotally connect the central boom and outer booms together.

Referring now to FIG. 2, it will be seen that a generally rectangular-shaped vertically disposed support frame 59 is rigidly secured to the rear end portion of the sprayer frame 27. The support frame 59 includes a pair of laterally spaced apart substantially parallel vertical supports 60, each of which is secured to the rear end of one of the longitudinal frame elements 29. The upper ends of the vertical supports 60 are rigidly interconnected by an upper frame element 61, while the lower ends thereof are rigidly interconnected by a lower frame element 62. The central boom member 56 has a pair of vertically disposed tubular slide members 63 rigidly affixed thereto, and each slide member accommodates one of the vertical supports 60 therethrough. Each slide member 63 is also provided with a reinforcing fillet 64, which is also connected to the central boom 56. It will, therefore, be seen that the central boom 56 is vertically slidable relative to the support frame 59.

Means are provided for vertically shifting the central boom 56 relative to the support frame 59, and this means includes a double-acting hydraulic piston and cylinder unit 65, which includes an elongate vertically disposed hydraulic cylinder 66, having a piston rod 67 movable therein. The cylinder 66 is mounted on the lower frame element 62 of the support frame 59 and the piston rod is connected to a U-shaped frame 68 which is mounted on the central boom. The U-shaped frame 68 includes a pair of vertical frame elements 69, each having their respective lower ends affixed to the central boom 56 and projecting upwardly therefrom. The upper ends of the vertical frame element 69 are rigidly interconnected by a horizontal transverse frame element 70 to which the piston rod 67 is connected. The hydraulic piston and cylinder unit 65 is connected to a source of hydraulic fluid under pressure so that extension and retraction of the unit permits raising and lowering of the U-shaped frame 68 and the central boom 56. Controls for operating the hydraulic unit are not shown in the drawings, but are located on the tractor for easy manipulation by the tractor operator.

Referring again to FIGS. 1 and 2, it will be seen that the outer ends of the outer booms are supported by suitable castor wheel assemblies 71. Each castor wheel assembly 71 includes a castor wheel 72, which is journaled on a castor wheel support frame 73. The castor wheel support frame 73 for each castor wheel assembly is rigidly interconnected to the lower end of an elongate vertically disposed post 74, which projects upwardly therefrom. The post 74 projects through, and is journaled in, a sleeve 75, which is rigidly affixed to the rear surface of the associated outer spray boom 55 intermediate the ends of the latter. The post 74 has a collar 76 affixed thereto to limit downward movement of the associated outer boom relative to the post 74.

Means are provided for permitting uniform vertical movement of the outer booms with the central boom during vertical movement of the latter. This means includes a pair of elongate flexible cables 77, each having one end secured to the lower frame element 62 of the support frame 59, and each cable having its other end secured by a bracket 78 affixed to the upper end of the associated post 74.

Each cable 77 is trained about a plurality of pulley and bracket assemblies, including a pulley and bracket assembly 79a mounted on the vertical frame 69 of the U-shaped frame 68. Each cable 77 is also trained about a pulley 79b mounted on one of the U-shaped pivot elements 57 of the central boom 56. Finally, each flexible cable 77 is trained about a pulley and bracket unit 79c, which is mounted on the associated outer boom adjacent the post 74. With this arrangement, it will be seen that, when the hydraulic piston and cylinder unit 65 is extended, the flexible cable 77 will be progressively tensioned, thereby raising the outer booms during upward shifting of the central boom. Conversely, when the hydraulic piston and cylinder unit 65 is retracted, tension on the cables 77 will be progressively diminished, thereby lowering the outer booms during vertical downward movement of the central boom.

Means are provided for stabilizing castoring movement of each castor wheel assembly 71, and this means includes a pair of elongate telescopic stabilizers 80, each having one end thereof secured to a bracket 80a having a pin projecting upwardly therefrom. Each bracket 80a is mounted on one of the castor wheel frames. Each stabilizer 80 has its other end secured to the lower surface of the associated outer boom intermediate the ends thereof. A set screw 82 adjusts the length of the telescopic stabilizer to the selected magnitude. This arrangement locks the castor wheel against pivoting about a vertical axis. The castor wheels are locked against movement during certain conditions.

Means are provided for applying the liquid spray to the standing crop, and this spray applying means is mounted on the outer booms 55. Each outer boom is provided with a plurality of laterally spaced apart elongate upwardly and rearwardly projecting brackets 82, each having its front end fixedly connected to the associated outer boom. An elongate substantially straight transverse member 83 is rigidly affixed to the rear upper ends of the brackets 82, and each transverse member 83 is disposed in substantially parallel relation with the associated outer boom 55. It will also be noted that each transverse member 83 has a length dimension corresponding to the length dimension of the associated outer boom.

Each transverse member serves to support an elongate hose 84, which has a plurality of rearwardly and downwardly facing nozzles 85, which are connected in communicating relation therewith. Each hose 84 is connected in communicating relation with a high pressure pump (not shown), which is operated by the PTO or other suitable hydraulic component (not shown) of the tractor. The high pressure pump is connected in communicating relation to an outlet for the tank 37 so that the liquid spray will be discharged from the nozzles under high pressure to produce a fine mist or fogging effect.

Referring again to FIGS. 1 and 2, it will be seen that one of the outer booms 55 has an elongate filler pipe 86 supported thereon. In the embodiment shown, the outer boom illustrated on the left side of FIG. 2 is provided with a plurality of spaced apart U-shaped brackets 86a in which is positioned the filler pipe 86. The outer end of the filler pipe 86 has a hose fitting 87 thereat, which defines the inlet end of the filler pipe. It will be noted that the filler pipe includes a curved inner end portion 86b that extends upwardly and terminates in a discharge end 88, positioned closely adjacent the filler opening 38 of the tank 37. The inlet fitting of the filler pipe 86 is located just beyond the outer end of the associated outer boom 55. With this arrangement, the tank may be filled from the end in the manner of the crop sprayer disclosed in my co-pending application Ser. No 542,575.

Each of the outer booms 55 is provided with a deflector plate 110, which extends throughout the length of the boom, and which presents a smoothly curved surface for engaging the standing crop during the spraying operation. It will be seen that each deflector plate 110 is connected to the associated outer boom by means of the bracket 111, which is secured to the deflector plate by suitable securing means 112, such as rivets, bolts, or the like. The bracket 111 is secured to a second bracket 114 by means of a nut and bolt assembly. The bracket 114 is also secured to the deflector plate 110 by suitable securing elements 115, such as bolts, rivets, or the like. The bracket 111 is provided with a tab 116, and the bracket 114 is provided with a tab 117, each tab 116, 117 engaging the outer boom. These tabs cooperate with the associated brackets to prevent disengagement of the brackets and deflector plate from the outer boom.

Referring now to FIGS. 4, 8, and 9, it will be seen that the interior 89 of the tank 37 is provided with a baffle frame 90, which facilitates mixing of the water and the chemical during movement of the tractor and crop sprayer. In this regard, it is pointed out that some of the chemicals used in a spray condition are commercially available in a powdered or pulverant form, and are mixed with water to form the spray solution. Other agricultural chemicals are in liquid form and are also mixed with water. The baffle frame 90 serves to cause constant admixing of these chemicals and water during movement of the crop sprayer so that an effective mixture is maintained.

The baffle device 90 includes a mounting frame comprised of a pair of similar substantially elongate straight base frame members 91, each of which is of angle construction. The base frame members are pivotally connected together intermediate their ends by a pivot 92. The base members may be pivoted between an operative extended position, as shown in FIGS. 8 and 9, and a collapsed position for insertion or removal from the tank.

Each base frame member 91 has a substantially flat rectangular-shaped baffle plate 93 affixed thereto adjacent one end thereof. One of the base frame members 91 has a baffle plate 94 secured thereto adjacent the inner end thereof. It will be seen that, when the base frame members are disposed in the operative position, three longitudinally spaced apart baffle plates are presented adjacent the lower interior surface of the tank 37.

Each base plate 91 also has a stop plate 95 affixed thereto, which engages the other base frame member when the frame members are pivoted to the operative position, as illustrated in FIG. 8. It will also be seen that each base frame member is provided with a tubular socket member 96 affixed thereto adjacent one end thereof, but inwardly of the associated baffle plate 93. It will be noted that the socket members 96 are inclined upwardly and inwardly when the base frame members are in the operative position.

The baffle device 90 also includes a pair of elongate substantially straight hold-down members 97, each having one end that is insertable into one of the socket members so that the hold-down members extend upwardly and converge towards the other hold-down member. Each hold-down member 97 has a bracket 98 affixed to the upper end thereof, which is positioned against the upper interior surface of the tank 37 adjacent the filler opening 38. Suitable nut and bolt assemblies 99 secure the hold-down members to the tank 37.

Each hold-down member 97 has a generally rectangular-shaped baffle plate 100 welded thereto intermediate the ends thereof. The baffle plates 100 are substantially larger in area than the baffle plates 93, 94 and present a large surface against which the liquid flows during forward traversing movement of the crop sprayer.

With this arrangement, it will be seen that, during the spraying operation, the crop sprayer will be moved in a forward direction, and the solution within the tank 37 will be sloshed back and forth during this movement. During this sloshing action of the liquid within the tank, the baffles will interfere with the forward and rearward flowing effect and will produce effective admixing of the spray solution.

When the baffle device 90 is inserted into the tank, the hold-down members 97 will be disassembled from the socket members 96. The base frame members 91 will be pivoted to a collapsed condition, wherein the ends of the frame members having the baffles 93 thereon are urged towards each other. The base frame can then be inserted through the filler opening and be pivoted to the extended operative condition, as illustrated in FIGS. 8 and 9, and the hold-down members will then be inserted and secured to the tank. Conversely, when the baffle device 90 is to be removed, the bolt and nut assemblies 99 will be removed and thereafter the hold-down members will be removed. The base frame members will again be pivoted to the collapsed position to permit removal of the base frame members through the filler opening.

In operation, the inner and outer booms will be adjusted to the correct height by extending or retracting the hydraulic piston and cylinder unit 65. Controls (not shown) for operating the piston and cylinder unit 65 are located on the tractor for ready manipulation by the tractor operator. The spray will be discharged from the nozzles 85 in a fine mist or fog so that all surfaces of the crop will be coated by the fine spray. As the tractor and crop sprayer are moved through the field of the crop to be sprayed, the tractor and crop sprayer belly plates will smoothly engage the standing crop, minimizing the danger thereto. The grain dividers for the tractor wheels and for the crop sprayer wheels deflect the standing crop away from the wheels and prevent any damage to the standing crop by movement of the wheels.

The deflector 110, which is mounted on the outer booms forwardly of the nozzles, will engage the grain and slowly but progressively push the standing crop downwardly as the tractor and crop sprayer are moved in a forward direction. After the standing crops are released from the deflector 110, the plants will spring upwardly and sway back and forth as the spray nozzles discharge the spray upon the turbulent moving crops. It is again pointed out that this turbulent movement permits the spray to effectively cover the plants in the manner of my co-pending application. This is especially important when fungicides are applied to standing crops, especially in the heading and ripening stages of crops, such as wheat or the like. Therefore, the ability to spray the crops in the later development stages of the plants substantially increases the yield. It is again pointed out that the tank may be easily filled in the same manner, as described in my co-pending application Ser. No. 542,575, since the inlet fitting 87 is located on the outer end of the boom for connection to a source of water and mixed chemicals for introduction into the tank.

Although not shown in the drawing, the crop sprayer may also be provided with a rear cable frame and rear cables that interconnect the outer booms to the central boom in the manner of my co-pending application Ser. No. 542,575. The outer booms may also be provided with front cables that extend from the outer ends thereof to the spray frame to permit effective maneuvering of the crop sprayer in the manner of my co-pending application Ser. No. 542,575.

From the foregoing, it will be seen that I have provided a novel crop sprayer which permits effective spraying of standing crops in the heading or ripening stages, while minimizing, if not eliminating, any likelihood of damage to the crops. The use of smoothly constructed belly pans and grain dividers permit the tractor and crop sprayer to move through standing crops without the attendant danger of damage to the wheat food or the like.

It will also be noted from the preceding paragraphs that I have provided a crop sprayer wherein the booms which support the nozzle assemblies may be readily vertically adjusted to the desired height by a single centrally located, hydraulic piston and cylinder unit.

Thus, it will be seen that I have provided a novel crop sprayer for use with a tractor, which functions in a more efficient manner than any heretofore known comparable arrangement.

What is claimed is:

1. A crop sprayer including a main frame, ground engaging wheels connected to the main frame, a spray tank mounted on said frame and adapted to contain a liquid agricultural chemical therein, an elongate horizontally disposed boom assembly extending transversely of said main frame and including an elongate central boom, a pair of similar elongate outer booms, each having its inner end pivotally connected to an outer end of said central boom for pivoting movement of each outer boom about a vertical axis, a pair of castor wheel assemblies, means connecting the outer end portion of each outer boom with one of said castor wheel assemblies and permitting vertical translation of the outer boom assembly relative to the associated castor wheel assembly, a spray device on said boom assembly including a plurality of spray nozzles connected in communicating relation to the tank and being operable to spray the liquid agricultural chemical upon a standing crop, a vertically disposed support frame on said mounting frame and extending upwardly therefrom, means on said central boom engaging said support frame for permitting vertical translation of the central boom relative to the support frame, power means on said support frame, means connecting said power means with said central boom whereby actuation of said power means will cause vertical translation of said central boom relative to said support frame, elongate flexible tensioning means interconnecting said support frame with said castor wheel assemblies and being engaged by said central boom and said outer booms whereby, when said power means is actuated to produce upward translation of said central boom, said tensioning means will be tensioned to cause simultaneous upward translation of said outer booms relative to said castor wheel assemblies.

2. The crop sprayer as defined in claim 1 and an elongate filler pipe mounted on one of said outer booms exteriorly thereof and having an inlet end disposed adjacent the outer end of said one outer boom, and means connecting the filler pipe in communicating relation with said tank.

3. The crop sprayer as defined in claim 1 and a pair of curved deflector plates, each being secured to one of said outer booms and each cooperating with the booms to engage the standing crop during the spraying operation and to produce mechanical turbulence of the crops by causing the plants to wave back and forth.

4. The crop sprayer as defined in claim 3 wherein said spray device includes a pair of elongate hoses connected in communicating relation with the spray tank, each hose being positioned exteriorly of and mounted on one of said booms and being connected in communicating relation with said spray nozzles so the nozzles spray the chemical liquid upon substantially the entire plant as a result of the mechanical turbulence produced by the movement of the booms and deflection plates over the standing crops.

* * * * *